United States Patent [19]

Koplick

[11] Patent Number: 4,960,466

[45] Date of Patent: Oct. 2, 1990

[54] COATING SOLUTIONS

[75] Inventor: Andrew J. Koplick, Victoria, Australia

[73] Assignee: Victorian Solar Energy Council, Victoria, Australia

[21] Appl. No.: 236,672

[22] PCT Filed: Sep. 22, 1987

[86] PCT No.: PCT/AU87/00324

§ 371 Date: Jul. 14, 1988

§ 102(e) Date: Jul. 14, 1988

[87] PCT Pub. No.: WO88/01988

PCT Pub. Date: Mar. 24, 1988

[30] Foreign Application Priority Data

Sep. 22, 1986 [AU] Australia .................................. 08135

[51] Int. Cl.$^5$ ........................ C09D 5/00; C09D 5/24
[52] U.S. Cl. .............................. 106/1.29; 106/287.18; 106/287.19; 106/452
[58] Field of Search ............ 106/1.29, 287.18, 286.19, 106/452

[56] References Cited

U.S. PATENT DOCUMENTS 3,216,835 11/1965 Saubestre .......................... 106/1.29
4,113,507 9/1987 McHenry et al. .............. 106/287.18
4,229,491 10/1980 Dislich et al. ....................... 427/108
4,668,299 5/1987 Nanao et al. ........................ 106/419

FOREIGN PATENT DOCUMENTS 135576 11/1985 Japan .

OTHER PUBLICATIONS

Chemical Abstracts, vol. 98, No. 8, 21 Feb. 1983, p. 279, abstract 58729j, Columbus Ohio, U.S.; V. N. Kokozei et al. Solubility of metal Oxides in Organic Media and the possiblity of Using Solutions for applying Oxide Coating.

Primary Examiner—Mark L. Bell
Assistant Examiner—Anthony J. Green
Attorney, Agent, or Firm—P. C. Benasutti

[57] ABSTRACT

A coating solution of a composition comprising in admixture (a) a solution of a cadmium compound (b) a solution of tin compound (c) a beta-diketone complexing agent, and (d) ammonia and or an amine, and reaction products thereof.

53 Claims, No Drawings

COATING SOLUTIONS

BACKGROUND OF THE INVENTION

This invention relates to a composition of a coating solution, a process for its preparation and a process for producing a layer of cadmium stannate on a substrate with the coating solution.

Cadmium stannate layers are known to have high electrical conductivity, high infra-red reflecting properties and a low absorption within the visible spectrum. These characteristics of cadmium stannate layers make them suitable for example, as layers in heated windows, windows for buildings, doors for microwave ovens or solar collector panels.

Conventionally cadmium stannate layers have been applied to substrates using high frequency atomisation. This process takes considerable time to deposit the desired thickness of film and usually requires expensive production equipment. Clearly when coating large or numerous substrates this is uneconomical.

An alternate process for producing a cadmium stannate layer upon a substrate has been proposed which entails spraying of an aqueous solution of cadmium and tin salts, to which other salts have been added as process additives, onto hot glass. The temperature of the glass (usually ranging from 600 to 700° C.) is critical as $CdSnO_3$ or $Cd_2SnO_4$ as well as CdO and $SnO_2$ may be formed. This process does not appear to achieve a uniform layer corresponding to the chemical composition of the coating solution.

A further approach is disclosed in U.S. Pat. No. 4,229,491 which describes a process in which glass is dipped at room temperature into a coating solution. Then it is withdrawn steadily from the coating solution and heated to a high temperature, to form a transparent cadmium stannate layer. This is said to ensure a fully homogeneous cadmium stannate layer and allow economical coating of glass panes as well as tubes of any given shape.

The patent describes the use of alcoholic solutions containing hydrolysable complexes formed from cadmium and tin compounds as dipping solutions. These complexes are derived from cadmium (lower alkyl) carboxylate, e.g. cadmium acetate, and a tin alkoxide, e.g. tin tetra-n-butylate. The preferred Cd:Sn ratio is from 1:1 to 2:1. Whereas acetylacetone is disclosed as an additive to such dipping solutions its effect on the process is not discussed.

Detailed studies of the system described in the U.S. Pat. No. 4,229,491 have shown that alcoholic solutions of tin alkoxides and cadmium acetate in the presence of acetylacetone alone are unstable and allow precipitation to occur. Such solutions do not give reliable cadmium stannate films. The films produced by this process may easily become subject to severe crazing and thus liable to be removed from the substrate to which they have been applied.

SUMMARY OF THE INVENTION

It has now been found that the behaviour of coating solutions of this type may be stabilized in the presence of ammonia or amines. The solution stability is neither affected by dilution nor dependent on the relative amounts of tin and cadmium once a beta-diketone complexing agent and, ammonia or amine are present:

Accordingly there is provided in the invention, a coating solution having a composition comprising in admixture (a) a solution of a cadmium compound
(b) a solution of a tin compound
(c) a beta-diketone complexing agent and
(d) ammonia or an amine, and reaction product thereof Normally the coating solutions are light-yellow coloured.

The solvents for the cadmium compound and tin compound are preferably anhydrous methanol, ethanol, n-propanol, n-butanol, tetrahydrofuran, ethers such as tetrahydrofuran, 1,2-dimethoxyethane, 2-methoxyethyl ether and halogenated hydrocarbon solvents or combinations and mixtures thereof.

Preferably the cadmium compound is a cadmium salt e.g. carboxylic acid salt of cadmium. Typically cadmium formate, cadmium acetate, cadmium propionate, cadmium butanoate or both linear and branched longer chained carboxylic acids are used.

Compounds of tin in either of its valence forms can be utilized. These compounds include tin (II) and tin (IV) alkoxides, tin (II) and tin (IV) carboxylates, combinations thereof and mixed tin (II) and tin (IV) alkoxide carboxylate derivatives. Examples of such tin compounds are $Sn(OR)_2$, $Sn(OR^I)_4$, $Sn(OOCR^{II})_2$, $Sn(OOCR^{III})_4$, $Sn(OR)_{2-x}(OOCR)_x$, $Sn(OR)_{4-x}(OOCR)_x$ in which R and $R^I$ are alkyl groups having from 1 to 15 carbon atoms, preferably from 1 to 8 carbon atoms and where x can have the value 1,2 or 3, $R^{II}$ and $R^{III}$ are alkyl groups having from 1 to 20 carbon atoms, preferably from 1 to 8 carbon atoms.

Further examples of tin compounds useful in the formation of cadmium stannate films according to this invention are organic tin alkoxides, organic tin carboxylates and mixed of organic tin alkoxide carboxylate derivatives represented by the formulae: $^1R_xSn(OR)_{4-x}$ $^1R_ySn(OOCR^1)_{4-y}$ $R_xSn(OR)_y(OOCR^1)_z$ where $^1R$ is an organic group containing from 1 to 10 carbon atoms and preferably from about 1 to 6 carbon atoms and where x,y,z can have values 1,2,3 such that $x+y+z=4$ and where R and $R^1$ are defined in the previous paragraph. The $^1R$ organic groups may be alkyl or aryl consisting solely of carbon and hydrogen atoms or additional elements may be present. The $^1R$ alkyl chain may be linear or branched.

Particular examples of these tin compounds are tin tetra-n-butoxide, methyltin tri-n-butoxide, tin tri-n-butoxide monoacetate, tin di-n-butoxide diacetate, methyltin triacetate, and combinations thereof.

The ammonia or amine may be present in the solution in the free state or in chemical combination, e.g. as a complex with either one or both of the components. For example, some or all of the ammonia may be added in the form of an ammine complex containing cadmium, such as a cadmium ammine carboxylate.

Preferred amines which may be used in the practice of the invention include primary, secondary or tertiary amines in which the nitrogen atom is a part of a saturated or unsaturated heterocyclic ring system containing one or more oxygen or nitrogen atoms or is linked to one or more straight or branched chain alkyl or alkenyl groups, cycloalkyl group or aromatic groups. Each of these groups may be substituted, for example, with one or more hydroxy, keto, amino, carboxylic acid or ester groups. Other compounds in which two nitrogen atoms are bound together such as in the derivates of hydrazine may also be useful. Typical examples of these amines are methylamine, dimethylamine, trimethylamine, ethylamine, diethylamine, triethylamine, monoethanolamine, diethanolamine, triethanolamine, morpholine, piperazine, pyrrolidone, aniline, 1,4-diazabicyclo(2,2,2,) octane or mixtures thereof.

Typical of the beta-diketone complexing agents used in the invention are acetylacetone, 1-phenylbutane-1,3-dione; 1,3-diphenylpropane-l,3-dione: 2,2,6,6, - tetramethylheptane-3,5-dione; 1,1,1-trifluoropentane-2,4-dione; 1,1,1,5,5,5 - hexafluoropentane - 2,4-dione; 1,1,1,5,5,6,6,6 - octafluorohexane - 2,4-dione; 1,1,1,5,5,6,6,7,7,7 - decafluoroheptane - 2,4-dione; ethyl acetoacetate and other esters of acetoacetic acid.

The invention also includes a process for producing a coating solution comprising reacting a solution of a cadmium compound and a tin compound in the presence of a beta-diketone complexing agent and ammonia or an amine.

The molar ratio of complexing agent to tin in the tin compound is preferably at least 0.3:1, more preferably 0.3:1 to 4.0:1 and most preferably 0.5:1 to 2:1. The molar ratio of ammonia or amine to tin in the tin compound is preferably in the range of up to 6.0:1, and more preferably from 0.8:1 to 0.4:1.

The effect of the ammonia concentration on the stability of solutions containing tin (e.g. tin alkoxide) and cadmium (e.g. cadmium acetate) is complex and not clearly understood. Solutions saturated with ammonia are usually stable but in some cases precipitation occurs and the reasons are unclear. Generally, resistivity values may not be enhanced in coatings derived from coating solutions having an excess (saturation level) ammonia. When the molar ratio of ammonia to tin in the tin compound is less than 0.8, the solution may be unstable and the reactants can form an insoluble precipitate even in the presence of a complexing agent. However, acceptable coatings can still be achieved. The behaviour of coating solutions having differing ammonia to tin molar ratio is described as follows:

(i) When the $NH_3/Sn$ ratio is less than 0.3 the coating solution is stable for about 3-4 days at room temperature (15-25° C.) before heavy precipitation occurs.

(ii) When the $NH_3/Sn$ ratio is between 0.3-0.8 the coating solution is stable for about 3-4 days at room temperature (15-25° C.) before precipitation becomes apparent. Coatings derived from such coating compositions (before precipitation) are of variable quality but are usually non-crazed and acceptable.

(iii) When the $NH_4/Sn$ ratio is between 0.8-4.0 the behaviour of the coating solution is indefinitely stable and coatings resulting from such coating solutions give the best quality films.

(iv) When the coating solution is fully saturated with ammonia, the behaviour of the solution is usually stable and the derived films are non-crazed but the resistivity values are more than for coatings described in (iii) above.

Generally, the molar ratio of cadmium in the cadmium compound to tin in the tin compound can range from 0.01:1 to 10:1. The preferred ratio is about 2:1. However the ratio of cadmium to tin in the coating is influenced by the amount of adventitious water, the type and quantity of complexing agent and amine present in solution all of which affect the deposition of the metal-oxide precursors.

The invention also includes a process for producing a layer of cadmium stannate on a substrate which comprises applying a coating of the above described coating solution to the substrate in an atmosphere which is substantially moisture free, hydrolysing the hydrolysable components of the coating composition, and heating the coating to a temperature sufficient to form the cadmium stannate.

The temperature for this purpose usually ranges up to 650° C, more preferably from 450 to 650° C and most preferably about 600° C. At these temperatures a polycrystalline film forms but higher temperatures of up to 750° C. may be used where more refractory substrates than soda-lime silica glass are being coated. The starting temperature of the heat treatment as well as the heating rates can also be varied.

The resultant cadmium stannate coating may be subsequently annealed under vacuum to lower its electrical resistivity. A typical annealing temperature is about 400° C. which may be maintained for up to about 1 hour. Alternatively, the cadmium stannate coating may be heat treated in a reducing or non-oxygen atmosphere for a predetermined period at atmospheric pressure.

The substrate onto which a layer of cadmium stannate is applied may be of a wide nature. For instance it may be applied to plate glass or cylindrical glass tubes, ground glass (e.g. 1-3 mm), solid or hollow silica particles (e.g. 100-200 $\mu$m), alumina particles (e.g. 100-200 $\mu$m) and clay materials having as the major constituents one or more of the following minerals represented by kaolinite $Al_4Si_4O_{10}(OH)_8$, montmorillonite $X_yAl_2(Al_ySi_{4-y}O_{10})(OH)_2$ where X is usually Na, Mg or Al and illite $K_y(AlFeMg_4Mg)$ $(Al_ySi_{8-y})O_{20}(OH)_4$. The type of glass is not critical and any type which does not become distorted during heating could be used. Examples of such glasses include the alkali-silica, borosilicate, aluminosilicate, boroaluminosilicate and fused silica glasses.

The process for applying the coating solution of the above composition to the substrate can be achieved by dip coating, spray coating, spin coating or roll coating. However, the method of application is not critical as the coating composition lends itself to any commercial application of a liquid solution to a substrate.

Investigations into other applications of the coating composition to differing substrates has revealed that it may also be utilized in applying cadmium stannate layers to silicon. In particular by use of the coating solution and process of the invention cadmium stannate layers may be applied to photovoltaic cells or as a layer in the manufacture of solar cells from amorphous silicon, for example as a conducting surface on a substrate such as glass.

More particularly experimentation has shown that it is possible to apply cadmium stannate to the textured surface of silicon (single, polycrystalline and amorphous silicon) in accordance with the invention. Testing these photovoltaic devices have shown consistent improvement in both open circuit voltage and short circuit degradation as compared to uncoated photovoltaic devices.

Consequently, the term substrate when used in this specification means any base capable of supporting a coating of cadmium stannate and is to include not only sheet material such as glass but also other bases such as silicon and ceramics or as a layer on other materials used in the layered construction of solar cells devices.

The invention is further described and illustrated by the following non-limiting Examples 1-14.

EXAMPLES 1–7

Solutions were prepared (in alcohol) containing the materials listed in Tables 1 and 2 in the proportions indicated (see also the notes to the Tables). The solutions were used to produce cadmium stannate coatings on microscope slides by the following procedure.

The substrates were dipped in the solution at ambient temperature (20–25° C.) and then withdrawn at a uniform speed of between 2.0 and 3.0 cm/s into a moisture-proof chamber containing at atmosphere of anhydrous air, nitrogen or argon saturated with solvent vapour. After dipping, the film on the slide was cured by transferring the slide, held in the moisture-proof chamber, to another vessel in which it was exposed for 2–5 minutes to either a static volume or a gently moving stream of moist air with relative humidity of about 10–30%, or to a gentle stream of anhydrous ammonia. The moisture-proof chamber in which the slide was suspended, was so constructed and arranged as to be easily dismounted from the dip-coating vessel and remounted in the hydrolysis vessel.

The coating solution was protected from atmospheric moisture to avoid hydrolysis occurring and hence the treatment of the film after coating was carried out either in a vessel which was separate from that containing the solvent or in the same vessel with a suitable lock arrangement protecting the moisture-sensitive coating solution.

After hydrolysis, the films were dried at about 100° C., heated in air from 420° C to 600° C for about 20 to 30 minutes and then allowed to cool to room temperature.

The results in the Tables show that with no acetylacetone or ammonia present in solution (Table 1, Ex. 3) a precipitate forms which can constitute up to 20% (w/w) of the recovered reactants. Neither acetylacetone nor ammonia alone arrest this precipitation and only when both are present does the behaviour of the solution stabilise and a clear lemon-yellow colour develops. Although amines arrest or hinder the formation of precipitates, certain longer chain alkyl amines e.g. tri-n-butylamine were found to affect the rheology of the solution and can cause a disrupted layer to form.

The results also show that the presence of ammonia or amines in solution is essential for the formation of coherent films because otherwise highly crazed films result after hydrolysis and render the film useless. The inferior coating is easily removed from the glass surface since adhesion is poor.

The results in Table 2 show the effects of not adding enough acetylacetone in the presence of ammonia. It can be seen from the results that precipitation occurs. After hydrolysis and heating of the films to about 600° C. a clear, strong light-yellow coloured layer of cadmium stannate ($Cd_2SnO_4$) is formed. Generally, an electrical resistance of 500–1,500 ohm/square is obtained for films of thicknesses 0.2–0.3 $\mu$m. Subsequent treatment or annealing of the layers under vacuum (400° C./$10^{-5}$–$10^{-6}$ torr) for 30–40 minutes lowers the electrical resistance to 80–400 ohms per square.

Alternatively treatment in a reducing atmosphere or with oxygen-free argon at 300–400° C also gives good results.

Usually the starting tin organometallic compound has ammonia incorporated into its structure, e.g. $Sn(O^nB)_4(NH_3)_{1.0-1.25}$. This material is a white solid and although extensively studied by spectroscopic means, the exact nature of the bonding is uncertain. As previously mentioned other starting tin compounds can be included so that both $Sn^{II}$ and $Sn^{IV}$ species make up the coating compositions but the preferred method in making up the coating solution of the preferred composition for producing cadmium stannate coating composition of cadmium stannate is one in which anhydrous cadmium acetate in methanol is mixed with tin tetra-n-butoxide ammoniate in ethanol with acetylacetone (c.f. Table 2, Ex. 7). An alternative procedure, however, in which anhydrous cadmium acetate, tin tetra-n-butoxide and acetylacetone are mixed in alcohol and immediately allowed to interact with the ammonia or amine is also satisfactory.

As indicated above, another method of incorporating the ammonia is by the use of cadmium bis-or tetra-ammine dicarboxylate complexes. With the above complexes the amount of ammonia can be accurately and easily controlled. In Table 1, Ex. 5 the results show that a Cd:Sn ratio in the films of 2.4:1 was obtained when the $NH_3$:Sn ratio was 2.0:1.

EXAMPLE 8

The coating of the present invention was applied to photovoltaic devices and tested for effectiveness.

75 mm diameter wafers, textured then diffused in the front surface to sheet resistance of 20 ohms/square and screen printed with a silver aluminium paste on the back surface were received from B. P. Solar (100 p-type unqualified starting material). Each wafer was divided into 3 or 4 strips. The strips were dipped into dilute hydrofluoric acid (5–10%) contained in a teflon vessel. After drying in air with a heat gun the strips were allowed to cool in a nitrogen atmosphere before dipping at 3–4 cm/s in a solution prepared as described in Table 2, Example 7. The strips were then heated and annealed as described earlier. Usually, the strips were dipped and heated a second time before a final vacuum annealing treatment.

2 $cm^2$ pieces were cleaved from the coated wafers and compared to 2 $cm^2$ cleaved samples from undipped wafers. The coated samples exhibited 20 mv increase in open circuit voltage, 2 amp/$cm^2$ increase in short circuit current and for the same fill factor a reduction of 4% of front surface metal coverage.

These results indicate the ultility of the cadmium stannate layer applied according to the invention.

EXAMPLE 9

Stannous 2-ethylhexanoate (0.1 g, 0.2 mmol) was added to a solution of anhydrous methanol (30 $cm^3$) containing tin tetra-n-butoxide ammoniate (3.4g, 7.9 mmol), cadmium acetate (3.7g, 16.2 mmol) and acetylacetone (0.4 g, 4.1 mmol). A clear stable yellow solution was formed. After dipping and firing as previously described a clear strong homogeneous layer was formed with electrical resistance in the range 1–5 k ohms per square.

EXAMPLE 10

Cadmium acetate (10.8g, 46.8 mmol) was dissolved in anhydrous methanol (60 $cm^3$) and added to tin tetra-n-butoxide ammoniate (10.0g, 23.4 mmol) dissolved in anhydrous ethanol (12 $cm^3$) in the presence of 1,1,1,5,5,5-hexafluoropentane-2,4-dione (2.4 g, 11.7 mmol). A clear stable yellow solution was formed. After dipping and firing as previously described a clear strong homogenous layer was formed with electrical resistance in the range 1–2 k ohms per square.

EXAMPLE 11

Cadmium acetate (4.60 g, 20 mmol) was added to a solution of anhydrous methanol (30 cm$^3$) containing tin(II)2-ethylhexanoate (4.05 g, 10 mmol), acetylacetone (0.5 g, 5 mmol) and diethylamine(3.07g, 4.4 cm$^3$, 42 mmol). A clear solution formed after stirring at room temperature for several hours. After dipping and firing as previously described a layer was formed with electrical resistance in the range 7–10 k ohms per square. Vacuum annealing lowered the resistance to about 400 ohms per square but exposure to the atmosphere over long periods was detrimental to the conductive properties.

EXAMPLE 12

Cadmium acetate (3.02 g, 13.1 mmol) was added to a solution of anhydrous methanol (15 cm$^3$) containing tin (IV) acetate (2.33g, 6.6 mmol), acetylacetone(0.33g, 3.3 mmol) and diethylamine(2.1 g, 3 cm$^3$, 28.7 mmol). A clear yellow stable solution was formed. After dipping and firing as previously described a yellow layer was formed with an electrical resistance in the range 1–1.5 k ohms per square.

EXAMPLE 13

Cadmium acetate (3.15g, 13.7 mmol) was added to a solution of anhydrous methanol (15 cm$^3$) containing tin (IV) tri-n-butoxide monoacetate(2.72g, 6.9 mmol), acetylacetone (0.35 g, 3.45 mmol) and diethylamine (2.2g, 3.1cm$^3$, 30 mmol). A clear yellow stable solution was formed. After dipping and firing as previously described a yellow layer was formed with an electrical resistance of about 1 k ohm per square.

EXAMPLE 14 n-Butylamine (0.28g, 3.8 mmol) was added to a solution of anhydrous methanol (15cm$^3$) containing tin tetra-n-butoxide (1.55g, 3.8 mmol), acetylacetone (0.19 g, 1.9 mmol) and cadmium acetate (1.75 g, 7.6 mmol). A clear yellow stable solution was formed after standing at room temperature. After dipping and firing as previously described a layer was formed with an electrical resistance in the range 1–2 k ohms per square. Further additions of n-butylamine (2.47g, 33.8 mmol) to the dipping solution had no detrimental effect on solution stability. Films derived from solutions after the additional amine was added usually had a slightly higher resistivity value.

EXAMPLE 15

An ethanol solution (15 cm$^3$) containing di-n-butyltin di-n-butoxide (10.4g 27.4 mmol), acetylacetone (1.4 g, 13.7 mmol) and diethylamine (1.0g, 1.4 cm$^3$, 13.2 mmol) was combined with a methanol solution (45 cm$^3$) containing cadmium acetate (12.6g, 54.9 mmol). A stable yellow solution was formed. After dipping and firing as previously described a slightly opaque layer was formed with electrical resistance in the range 4–5 k ohms per square.

EXAMPLE 16

An ethanol solution (10 cm$^3$) containing tin tetra-n-butoxide ammoniate (8.2 g, 19.2 mmol) and acetylacetone (0.96g, 9.6 mmol) was combined with an n-butanol solution (12 cm$^3$) containing cadmium butanoate (11.0 g, 38.3 mmol). The reaction mixture was further diluted with methanol (32 cm$^3$) to form a light yellow coloured solution. After dipping and firing as previously described a clear strong layer was formed with electrical resistance in the range 5–10 k ohm per square.

EXAMPLE 17

An ethanol solution (9 cm$^3$) containing tin tetra-n-butoxide ammoniate (6.5 g, 15.2 mmol) and acetylacetone (0.8 g, 7.6 mmol) was combined with a methanol solution 28 cm$^3$) containing cadmium propanoate (7.9g, 30.4 mmol). A stable yellow solution was formed. After dipping and firing as previously described a clear strong layer with an electrical resistance in the range 2–5 k ohms per square was formed.

EXAMPLE 18

The cadmium to tin ratio of the film can be varied over a wide range simply by adjusting the concentration of the components in solution. Thus, tin tetra-n-butoxide ammoniate (11.4 g, 26.6 mmol) together with acetylacetone (1.7 g, 16.9 mmol) was dissolved in methanol (29 cm$^3$, 23.7 g,) to make up a solution weighing 36.8g. In a separate vessel a solution of methanol (98 cm$^3$, 77.2g) containing cadmium acetate (20.09, 86.8 mmol) was also prepared to make up a solution weighing a total of 97.2 g.

Aliquots of 4–5g of the tin solution were transferred by syringe and accurately weighed in 5 bottles previously flushed with nitrogen and capped with suba seals. Similarly, portions of the cadmium acetate solution were transferred by syringe and added to the 5 bottles in a manner such that five dip-coat solutions were made up in which the cadmium to tin ratio varied over the range 0.3 to 10.0. The results are shown in Table 3.

Unfortunately, the reasons for the discrepancy between the values Cd/Sn soln. and Cd/Sn film for higher concentrations of cadmium are unclear but the experiment showed that strongly adherent films can be produced in which the cadmium to tin ratio varies from 0.2 to 10.0. The solutions are stable for all concentrations of cadmium acetate in the above experiment.

EXAMPLE 19

An ethanol solution (100 cm$^3$) containing tin tetra-n-butoxide ammoniate (8.5g, 19.9 mmol) and acetylacetone (1.0g, 9.9 mmol) was combined with a methanol solution (250 cm$^3$) containing cadmium acetate (9.2 g, 39.9 mmol). To the combined mixture silica particles (70 g, 100–200 μm) were added with constant agitation. After standing at room temperature for about 10 minutes the solvent was removed under vacuum and the particles were further dried in air at 100° C. for 10–12 hours. Heating at 600° C. for about 10 hours produced silica particles coated in cadmium stannate.

EXAMPLE 20

An ethanol solution (3 cm$^3$) containing tin tetra-n-butoxide (2.1 g, 5.1 mmol) and acetylacetone (0.3 g, 3.0 mmol) was combined with a methanol solution (18 cm$^3$) containing bis-ammine cadmium acetate (0.7g, 2.6 mmol) and cadmium acetate (1.8g, 7.8 mmol) so that a solution molar ratio Cd/Sn~2.0 and NH$_3$/Sn~1.0 was obtained. After dipping and firing as previously described a clear strong homogeneous layer was formed with electrical resistance in the range 1–1.5 k ohms per square.

EXAMPLE 21

An ethanol solution (3cm$^3$) containing tin tetra-n-butoxide (2.6g, 6.3 mmol) and acetylacetone (0.3 g, 3.0 mmol) was combined with a methanol solution (16 cm$^3$) containing tetra-ammine cadmium acetate (2.8g, 9.4 mmol) and cadmium acetate (0.7g, 3.0 mmol) so that the solution molar ratio Cd/Sn~2.0 and NH$_3$/Sn~6.0 was obtained. After dipping and firing as previously described a clear strong homogeneous layer was formed with electrical resistance in the range 0.8-2.0 k ohms per square.

EXAMPLE 22

An ethanol solution (3 cm$^3$) containing tin tetra-n-butoxide (2.5 g, 6.0 mmol) and acetylacetone (0.3 g, 3.0 mmol) was combined with a methanol solution (20 cm$^3$) containing tetra-ammine cadmium acetate (3.6 g, 12.0 mmol) so that the solution molar ratio Cd/Sn~2.0 and NH$_3$/Sn~8.0 was obtained. Extreme caution is needed to exclude moisture because otherwise insoluble cadmium hydroxide can be readily formed. Trace amounts of insoluble material can be removed by filtration through celite under nitrogen. The solution developed a very intense yellow colour over 3 days. After dipping and firing as previously described a clear strong homogenous layer was formed with electrical resistance in the range 2-9 k ohms per square.

(f) "Cloudiness" developed 4hours after mixing; Et$_2$NH (32.6 mmoles) added and solution became transparent after heating to 40° C.
(g) n.d.=not determined
(h) No acac present; solution left standing fourteen days; precipitate constituted 20% wt of recovered material
(i) slide dipped 10 to 20 minutes after mixing; heavily crazed film produced
(j) Et$_2$(22.9 mmoles) added 2 to 3 hours after mixing and solution turned clear and pale yellow. The solution remained stable without precipitation
(k) Slide dipped soon after addition of Et$_2$NH: clear yellow coherent film produced
(l) Cd(NH$_3$)$_2$(OOCCH$_3$)$_2$ (3.16 g, 11.92 mmol) added to solution such that NH$_3$/Sn=3.0; Cd/S$_n$=2.0

TABLE 2

A study of the mixing of tin tetra-n-butoxide and cadmium acetate in alcohol solution in the presence of ammonia

| Exp. | Sn(O$^n$Bu)$_4$.(NH$_3$)$_1$$^a$ g | mmoles | EtOH cm$^3$ | Cd(OOCCH$_3$)$_2$ g | mmoles | MeOH cm$^3$ | acac$^b$ mg | mmoles | calc.$^b$ Cd/Sn ratio | found$^b$ Cd/Sn ratio | calc.$^b$ acac/Sn ratio |
|---|---|---|---|---|---|---|---|---|---|---|---|
| 6 | 10.70$^c$ | 24.99 | 14 | 11.99 | 52.02 | 42 | 0 | 0 | 2.08 | 3.3$^d$ | 0.00 |
|   | " | " | " | " | " | " | 123 | 1.23 | $e$ | 3.7$^f$ | 0.05 |
|   | " | " | " | " | " | " | 181 | 1.81 | $g$ | 3.5$^h$ | 0.07 |
| 7 | 33.00$^i$ | 77.07 | 45 | 36.9 | 160.08 | 129 | 2826 | 28.23 | 2.08 | 2.0$^j$ | 0.37 |

NOTES TO TABLE 2

(a) Compound examined by elemental analysis for carbon, hydrogen and nitrogen, $^1$H-, $^{119}$Sn-n.m.r. but extract structure unknown
(b) See Table 1 for explanation
(c) Precipitate formed 10 to 15 hours after mixing without acetylacetone
(d) Slide dipped two days after mixing
(e) Ratio unknown because of increased precipitation four days after mixing
(f) Slide dipped four days after mixing

TABLE 1

A study of the mixing of tin tetra-n-butoxide (ammonia free) and cadmium acetate in alcohol solution

| Exp. | Sn(O$^n$Bu)$_4$$^a$ g | mmoles | EtOH cm$^3$ | Cd(OOCCH$_3$)$_2$ g | mmoles | MeOH cm$^3$ | acac.$^b$ g | mmoles | calc.$^c$ Cd/Sn ratio | found$^d$ Cd/Sn ratio | calc.$^c$ acac/Sn ratio |
|---|---|---|---|---|---|---|---|---|---|---|---|
| 1 | 14.9$^e$ | 36.24 | 20 | 16.67 | 72.32 | 58 | 0.88 | 8.79 | 1.99 | 2.8–3.0 | 0.24 |
| 2 | 13.42$^f$ | 32.64 | 18 | 15.15 | 65.73 | 42 | 1.68 | 16.32 | 2.10 | n.d.$^g$ | 0.50 |
| 3 | 2.30$^h$ | 5.50 | 0 | 2.50 | 10.85 | 12 | 0 | 0 | 1.97 | $h$ | 0.00 |
| 4a | 9.52 | 22.93 | 13 | 10.57 | 45.96 | 45 | 0.81 | 8.07 | 2.00 | 2.6$^i$ | 0.35 |
| 4b | 9.52$^j$ | " | " | " | " | " | " | " | " | 2.5–2.7$^k$ | 0.35 |
| 5 | 3.27 | 7.95 | 0 | 0.92$^l$ | 3.97 | 22 | 0.40 | 3.98 | 2.0 | 2.4 | 0.50 |

NOTES TO TABLE 1

(a) Compound identified by elemental analysis for carbon hydrogen, infra-red, mass spectrometry, $^1$H-, $^{13}$C-, $^{119}$Sn-n.m.r.
(b) Acetylacetone
(c) Calculated molar ratio in solution
(d) Atomic ratio of film determined by scanning electron microscope - energy dispersive techniques
(e) Precipitation occurred about 1 to 2 hours after mixing hence small amount of acac added; after seven days white solid appeared; after two months diethylamine added and white ppt. dissolved (Sn/amine=0.5)
(g) Amount of precipitation increased seven days after mixing but solid failed to dissolve after addition of acac
(h) Solution filtered under nitrogen and slide dipped seven days after mixing
(i) Stable solution (i.e. no precipitation) in the presence of both ammonia (Sn/NH$_3$ - 1.0 approx.) and acetylacetone (acac/Sn=0.5–0.36)
(j) Cd$_2$SnO$_4$ identified by X-ray diffraction techniques; presence of small amounts of CdO, Cd/Sn =2.0 but can vary in range 2.0-2.7 probably due to adventitious water; sheet resistance after heating to 600° C in range 500–1,500 ohm/square

TABLE 3

A study of the formation of cadmium stannate films with excess cadmium oxide

| Cd/Sn$^a$ soln. | 0.3 | 0.4 | 2.9 | 4.5 | 7.6 |
|---|---|---|---|---|---|
| Cd/Sn$^b$ film. | 0.3 | 0.5 | 3.1 | 6.8 | 9.4 |

$^a$calculated from concentrations and amounts added
$^b$see note (d) Table 1.

Those skilled in the art will appreciate that the invention described herein is susceptible to variations and modifications other than those specifically described. It is to be understood that the invention includes all such variations and modifications which fall within its spirit and scope.

THE CLAIMS DEFINING THE INVENTION ARE AS FOLLOWS:

1. A coating solution of a composition consisting essentially of in admixture
   (a) a solution of a cadmium compound
   (b) a solution of tin compound
   (c) a beta-diketone complexing agent, and
   (d) at least one nitrogen-containing compound selected from the group consisting of ammonia, amine, and reaction products thereof.

2. A coating solution according to claim 1 wherein the cadmium compound is a cadmium salt.

3. A coating solution according to claim 2 wherein the cadmium salt is a carboxylic salt of cadmium.

4. A coating solution according to claim 2 wherein the cadmium salt is cadmium formate, cadmium acetate, cadmium propionate, cadmium butanoate, or longer chain, both linear and branched carboxylic acids.

5. A coating solution according to claim 1 wherein the tin compound is selected from tin (II) and tin (IV) alkoxides, tin (II) and tin (IV) carboxylates and mixtures and combinations thereof.

6. A coating solution according to claim 1 wherein the tin compound is selected from $Sn(OR)_2$, $Sn(OR^I)_4$, $Sn(OOCR^{II})_2$, $Sn(OOCR^{III})_4$, $Sn(OR)_{2-x}(OOCR)_x$ and $Sn(OR^I)_{4-x}(OOCR)_x$ in which R and $R^I$ are alkyl groups having from 1 to 15 carbon atoms and $R^{II}$ and $R^{III}$ are alkyl groups having from 1 to 20 carbons.

7. A coating solution according to claim 6 wherein R, $R^I$, $R^{II}$ and $R^{III}$ are alkyl groups having from 1 to 8 carbon atoms.

8. A coating solution according to claim 1 wherein the tin compound is selected from organic tin alkoxides, organic tin carboxylates and mixed organic tin alkoxide carboxylate derivatives represented by the formula: $^1R_xSn(OR)_{4-x}$, $^1R_ySn(OOCR^1)_{4-y}$ and $^1R_wSn(OR)_y(OOCR^1)_2$ where $^1R$ is an organic group containing from 1 to 10 carbon atoms, x,y,z can have values 1,2,3 such that $x+y+z=4$ and R and $R^1$ are alkyl groups having from 1 to 15 carbon atoms.

9. A coating solution according to claim 7 wherein the tin compound is tin tetra n-butoxide, tin tri-n-buoxide monoacetate or tin(IV) acetate.

10. A coating solution according to claim 1 wherein the nitrogen-containing compound is in the free state.

11. A coating solution according to claim 1 wherein the nitrogen containing compound is in a chemically combined state.

12. A coating solution according to claim 11 wherein the ammonia is an ammine complex containing cadmium and the amine is an amine complex containing cadmium.

13. A coating solution according to claim 12 wherein the ammine complex containing cadmium is a bis-or tetra-ammine cadmium carboxylate.

14. A coating solution according to claim 12 wherein the amine complex containing cadmium is a cadmium amine carboxylate.

15. A coating solution according to claim 1 wherein the beta-diketone complexing agent is selected from acetylacetone; 1-phenylbutane-1,3-dione; 1,3-diphenylpropane-1,3-dione; 2,2,6,6,-tetra-methylheptane-3,5-dione; 1,1,1-trifluoropentane-2,4-dione; 1,1,1,5,5,5-hexafluoropentane-2-4-dione; 1,1,1,5,5,6,6,6-octaflurohexane-2,4-dione; and 1,1,1,5,5,6,6,7,7,7-decafluoroheptane-2,4-dione; ethyl acetoacetate and other esters of acetoacetic acid.

16. A coating solution according to claim 1 wherein the amine is selected from primary, secondary or tertiary amines having at least one nitrogen atom as part of a saturated or unsaturated heterocyclic ring system containing one or more oxygen or nitrogen atoms or linked to one or more straight- or branched-chain alkyl or alkenyl groups, cycloalkyl group or aromatic group.

17. A coating solution according to claim 16 wherein one or more of said groups is substituted by a keto, amino, carboxylic acid or ester group.

18. A coating solution according to claim 16 wherein the amine is methylamine, dimethylamine, trimethylamine, ethylamine, diethylamine, triethylamine, monoethanolamine, diethanolamine, triethanolamine, morpholine, piperazine, pyrrolidone, pyridine, aniline, 1,4-diazabicyclo (2,2,2) octane or mixture thereof.

19. A process of producing a coating solution applicable to a substrate to produce a stable coating thereon comprising reacting a solution of a cadmium compound and a tin compound in the presence of a beta-diketone complexing agent and ammonia or an amine.

20. A process according to claim 19 wherein the molar ratio of complexing agent to tin in the tin compound is at least 0.3:1.

21. A process according to claim 19 wherein the molar ratio of complexing agent to tin in the tin compound is between 0.3:1 to 4:1.

22. A process according to claim 19 wherein the molar ratio of complexing agent to tin in the tin compound is between 0.5:1 to 2:1.

23. A process according to claim 19 wherein the molar ratio of ammonia or amine to tin in the tin compound is up to 6:1.

24. A process according to claim 19 wherein the molar ratio of ammonia or amine to tin in the tin compound is from 0.8 to 4:1.

25. A process according to claim 19 wherein the ratio of cadmium in the cadmium compound to tin in the tin compound is from 0.01:1 to 10:1.

26. A process according to claim 19 wherein the ratio of cadmium in the cadmium compound to tin in the tin compound is about 2.0:1.

27. A process of producing a coating solution applicable to a substrate to produce a stable coating thereon comprising reacting a solution of a cadmium compound and a tin compound in the presence of a beta-diketone complexing agent and ammonia or an amine wherein the molar ratio of complexing agent to tin in the tin compound is at least 0.3:1.

28. A process according to claim 27 wherein the molar ratio of complexing agent to tin in the tin compound is between 0.3:1 to 4:1.

29. A process according to claim 28 wherein the molar ratio of complexing agent to tin in the tin compound is between 0.5:1 to 2:1.

30. A process according to claim 27 wherein the molar ratio of ammonia or amine to tin in the tin compound is up to 6:1.

31. A process according to claim 28 wherein the molar ratio of ammonia or amine to tin in the tin compound is up to 6:1.

32. A process according to claim 29 wherein the molar ratio of ammonia or amine to tin in the tin compound is up to 6:1.

33. A process according to claim 30 wherein the molar ratio of ammonia or amine to tin in the tin compound is from 0.8 to 4:1.

34. A process according to claim 31 wherein the molar ratio of ammonia or amine to tin in the tin compound is from 0.8 to 4:1.

35. A process according to claim 32 wherein the molar ratio of ammonia or amine to tin in the tin compound is from 0.8 to 4:1.

36. A process according to claim 27 wherein the ratio of cadmium in the cadmium compound to tin in the tin compound is from 0.01:1 to 10:1.

37. A process according to claim 28 wherein the ratio of cadmium in the cadmium compound to tin in the tin compound is from 0.01:1 to 10:1.

38. A process according to claim 29 wherein the ratio of cadmium in the cadmium compound to tin in the tin compound is from 0.01:1 to 10:1.

39. A process according to claim 30 wherein the ratio of cadmium in the cadmium compound to tin in the tin compound is from 0.01:1 to 10:1.

40. A process according to claim 31 wherein the ratio of cadmium in the cadmium compound to tin in the tin compound is from 0.01:1 to 10:1.

41. A process according to claim 32 wherein the ratio of cadmium in the cadmium compound to tin in the tin compound is from 0.01:1 to 10:1.

42. A process according to claim 33 wherein the ratio of cadmium in the cadmium compound to tin in the tin compound is from 0.01:1 to 10:1.

43. A process according to claim 34 wherein the ratio of cadmium in the cadmium compound to tin in the tin compound is from 0.01:1 to 10:1.

44. A process according to claim 35 wherein the ratio of cadmium in the cadmium compound to tin in the tin compound is from 0.01:1 to 10:1.

45. A process according to claim 36 wherein the ratio of cadmium in the cadmium compound to tin in the tin compound is about 2.0:1.

46. A process according to claim 37 wherein the ratio of cadmium in the cadmium compound to tin in the tin compound is about 2.0:1.

47. A process according to claim 38 wherein the ratio of cadmium in the cadmium compound to tin in the tin compound is about 2.0:1.

48. A process according to claim 39 wherein the ratio of cadmium in the cadmium compound to tin in the tin compound is about 2.0:1.

49. A process according to claim 40 wherein the ratio of cadmium in the cadmium compound to tin in the tin compound is about 2.0:1.

50. A process according to claim 41 wherein the ratio of cadmium in the cadmium compound to tin in the tin compound is about 2.0:1.

51. A process according to claim 42 wherein the ratio of cadmium in the cadmium compound to tin in the tin compound is about 2.0:1.

52. A process according to claim 43 wherein the ratio of cadmium in the cadmium compound to tin in the tin compound is about 2.0:1.

53. A process according to claim 44 wherein the ratio of cadmium in the cadmium compound to tin in the tin compound is about 2.0:1.

* * * * *